(12) United States Patent
Maurer (10) Patent No.: US 9,451,457 B2
(45) Date of Patent: Sep. 20, 2016

(54) METHOD TO ENHANCE HIGH AVAILABILITY IN A SECURE TELECOMMUNICATIONS NETWORK, AND TELECOMMUNICATIONS NETWORK COMPRISING A PLURALITY OF REMOTE NODES

(75) Inventor: Juergen Maurer, Bad Neuenahr/Ahreweiler (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/123,541

(22) PCT Filed: Jul. 16, 2012

(86) PCT No.: PCT/EP2012/002981
§ 371 (c)(1),
(2), (4) Date: Jan. 2, 2014

(87) PCT Pub. No.: WO2013/010658
PCT Pub. Date: Jan. 24, 2013

(65) Prior Publication Data
US 2014/0189837 A1 Jul. 3, 2014

(30) Foreign Application Priority Data

Jul. 15, 2011 (EP) .................................... 11005796

(51) Int. Cl.
*H04W 12/02* (2009.01)
*H04W 12/04* (2009.01)
(Continued)

(52) U.S. Cl.
CPC ............. *H04W 12/06* (2013.01); *H04W 12/02* (2013.01); *H04W 12/04* (2013.01); *H04L 63/0272* (2013.01); *H04L 63/0838* (2013.01); *H04L 63/164* (2013.01); *H04L 63/20* (2013.01)

(58) Field of Classification Search
CPC ....... H04L 29/06; H04L 63/20; H04W 12/06
See application file for complete search history.

(56) References Cited

U.S. PATENT DOCUMENTS 7,852,752 B2 * 12/2010 Kano .................. H04J 14/0227
370/221
2002/0112072 A1 * 8/2002 Jain ........................ H04L 45/00
709/239

(Continued)

FOREIGN PATENT DOCUMENTS

CN           1933422 A    3/2007
CN         102025547 A    4/2011

(Continued)

OTHER PUBLICATIONS

3GPP TSG-SA WG2 # 78 S2-101361, "Solution 1 variant for Inter-H(H(e)NB mobility with L-GW relocation", Feb. 16, 2010, www.3gpp.org/ftp/tsg_sa/WG2_Arch/TSGS2_78_San_Francisco/Docs/S2-101361.zip.

*Primary Examiner* — Abu Sholeman
*Assistant Examiner* — Thanh T Le
(74) *Attorney, Agent, or Firm* — Leydig, Voit & Mayer, Ltd.

(57) ABSTRACT

A method for enhancing high availability in a secure telecommunications network includes: switching from a first operational mode to a second operational mode based on an exchange of at least a first message and a second message between at least one specific remote node of the plurality of remote nodes and one or a plurality of further network nodes using Dynamic Host Configuration Protocol (DHCP). The first message includes a request from the at least one specific remote node of the plurality of remote nodes and the second message includes an answer to the first message by a network management node. The second message includes a one-time password.

8 Claims, 2 Drawing Sheets

(51) Int. Cl.
   *H04W 12/06*  (2009.01)
   *H04L 29/06*  (2006.01)

(56) References Cited

U.S. PATENT DOCUMENTS

| | | | |
|---|---|---|---|
| 2008/0034110 A1 | 2/2008 | Suganthi et al. | |
| 2009/0106831 A1* | 4/2009 | Wu | H04L 63/062 726/15 |
| 2009/0165099 A1* | 6/2009 | Eldar | H04L 41/0869 726/5 |
| 2009/0222577 A1 | 9/2009 | Goodman et al. | |
| 2009/0225652 A1* | 9/2009 | Vasseur | H04L 41/0677 370/225 |
| 2009/0265576 A1* | 10/2009 | Blum | H04L 41/026 714/2 |
| 2010/0008220 A1 | 1/2010 | Le Roux et al. | |
| 2010/0290358 A1* | 11/2010 | Karunakaran | H04L 12/4625 370/252 |
| 2010/0306572 A1* | 12/2010 | Salvarani | H04L 63/164 714/4.1 |
| 2011/0090786 A1* | 4/2011 | Liu | H04L 12/5695 370/221 |
| 2011/0176531 A1* | 7/2011 | Rune | H04W 76/041 370/338 |
| 2011/0235595 A1* | 9/2011 | Mehta | H04W 8/082 370/329 |
| 2012/0063300 A1 | 3/2012 | Sahin et al. | |
| 2012/0290728 A1* | 11/2012 | Zhang | H04W 76/02 709/227 |

FOREIGN PATENT DOCUMENTS

| | | |
|---|---|---|
| JP | 2004304696 A | 10/2004 |
| JP | 2013537387 A | 9/2013 |
| WO | WO 0182533 A2 | 11/2001 |

\* cited by examiner

METHOD TO ENHANCE HIGH AVAILABILITY IN A SECURE TELECOMMUNICATIONS NETWORK, AND TELECOMMUNICATIONS NETWORK COMPRISING A PLURALITY OF REMOTE NODES

CROSS-REFERENCE TO RELATED APPLICATIONS

This application is a U.S. National Phase application under 35 U.S.C. §371 of International Application No. PCT/EP2012/002981, filed on Jul. 16, 2012, and claims benefit to European Patent Application No. 11005796.5, filed on Jul. 15, 2011. The International Application was published in English on Jan. 24, 2013, as WO 2013/010658 A1 under PCT Article 21(2).

FIELD

The present invention relates inter alia to a method to enhance availability in a secure telecommunications network, the telecommunications network comprising a plurality of remote nodes, one or a plurality of further network nodes, and at least one security gateway, wherein each of the plurality of remote nodes communicates to the one or the plurality of further network nodes, wherein in a first operational mode of the plurality of remote nodes, during normal operation of the at least one security gateway, each of the plurality of remote nodes communicates with the at least one security gateway via a secure communication tunnel. The present invention furthermore relates to a telecommunications network comprising a plurality of remote nodes, one or a plurality of further network nodes, and at least one security gateway, wherein the telecommunications network is arranged to enhance high availability of secure communication functionality between the at least one security gateway and the one or the plurality of further network nodes.

BACKGROUND

With the migration toward Internet Protocol (IP) over Ethernet especially in the Access Network, more and more network nodes (or network sites), especially remote network nodes, are protected by secure communications tunnels, such as IPsec tunnels (Internet Protocol Security tunnels), i.e. from the base station up to some centralized nodes or sites, where the security gateways, e.g. the Internet Protocol Security Gateways (IPsecGWs), are located. In larger networks several hundred up to a few thousand base stations or other network nodes might be connected to a pair of IPSecGWs. This also means that severe failure of security gateways (e.g. IPsecGW failure) or issues with the certificate handling might lead to large impact for the radio service.

Even when providing redundancy of security gateways, such as IPsecGW redundancy, as well as providing smart switch-over mechanisms or stateful switch-over mechanisms, there is a reasonable risk of severe failures of the cluster of security gateways, e.g. redundant IPsec cluster. And even an issue with respect to certificate handling might lead to the situation that all radio nodes are not longer allowed to setup secure communication tunnels to the security gateway, such as IPsec tunnels.

As also the management plane of the radio node shall be protected by the security mechanism, especially IPsec, loss of the functionality of the security mechanism (e.g. IPsec) means not only the loss of the radio service, but also the loss of remote management access to the radio nodes. That means the radio nodes cannot be switched back to non-security communication (e.g. non-IPsec communication) by an operator without site visit.

An automatic switch back of the radio nodes to non-security communication (e.g. non-IPsec) (i.e. in case the secure communication tunnel, such as the IPsec tunnel, cannot be established) is from security perspective not acceptable, as this might give a "man in the middle" the opportunity to disable the security measure.

SUMMARY

In an embodiment, the present invention provides a method for enhancing high availability in a secure telecommunications network. The telecommunications network includes a plurality of remote nodes, one or a plurality of further network nodes, and at least one security gateway. Each of the plurality of remote nodes communicates with the one or the plurality of further network nodes. In a first operational mode of the plurality of remote nodes, during normal operation of the at least one security gateway, each of the plurality of remote nodes communicates with the at least one security gateway via a secure communication tunnel. In a second operational mode of the plurality of remote nodes, during failure of the secure communication tunnel, at least one specific remote node of the plurality of remote nodes is connected to the one or the plurality of further network nodes by bypassing the security gateway. The method includes: switching from the first operational mode to the second operational mode based on an exchange of at least a first message and a second message between the at least one specific remote node of the plurality of remote nodes and the one or the plurality of further network nodes using Dynamic Host Configuration Protocol (DHCP). The first message includes a request from the at least one specific remote node of the plurality of remote nodes and the second message includes an answer to the first message by a network management node. The second message includes a one-time password.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a method to enhance high availability in a telecommunications network normally using secure communication tunnels by providing a simple and easy yet secure mechanism to restore communication once secure communication tunnels or channels are broken due to severe failure of network nodes, especially of security gateways.

The invention provides how, in such severe failure cases, the nodes connected normally via a secure communication tunnel, especially connected (remote) radio nodes, can be switched to a non-security communication mode of operation, especially non-IPsec communication, in an operator controlled way. This allows the operator to maintain the radio service even if IPSec protection is temporarily interrupted. Furthermore, this allows for avoiding persistent decrease of security level in the communication between nodes of the telecommunications network. Additionally, a self-healing functionality is provided such that additional out of band communication channels (with respect to the Internet Protocol Security connectivity between the remote nodes and the further network nodes) is not required.

In an embodiment, the present invention provides a method to enhance high availability in a secure telecommunications network, the telecommunications network comprising a plurality of remote nodes, one or a plurality of further network nodes, and at least one security gateway, wherein each of the plurality of remote nodes communicates to the one or the plurality of further network nodes, wherein in a first operational mode of the plurality of remote nodes, during normal operation of the at least one security gateway, each of the plurality of remote nodes communicates with the at least one security gateway via a secure communication tunnel, wherein in a second operational mode of the plurality of remote nodes, during failure of the secure communication tunnel, at least one specific remote node of the plurality of remote nodes is connected to the one or the plurality of further network nodes by bypassing the security gateway, wherein the first operational mode is switched to the second operational mode by an exchange of at least a first message and a second message between the at least one specific remote node of the plurality of remote nodes and the one or the plurality of further network nodes using the DHCP (Dynamic Host Configuration Protocol) protocol.

According to the present invention it is thereby advantageously possible, that in case of a severe failure of the security gateway cluster, e.g. an IPsec cluster failure, a switch off of the functionality of secure communication is possible, e.g. by switching off the IPsec functionality at the remote node (e.g. a radio node or a base station or an eNodeB) in a secure and operator controlled way. According to the present invention, the effort for this security bypass functionality (or IPsec emergency bypass functionality) can be reduced to a minimum and especially does not require any site visit at the site of the remote node or plurality of remote nodes. Furthermore, it is possible with the present invention that even a plurality of remote nodes (or even all remote nodes) affected by the security gateway failure can be switched in a second operational mode corresponding to a security bypass functionality (or "IPsec emergency bypass" mode) in very short time.

It is preferred according to the present invention, that the first message comprises a request from the at least one specific remote node of the plurality of remote nodes, and the second message comprises an answer to the first message by a network management node, the second message comprising a one-time password.

Thereby it is advantageously possible, that the operational mode related to the secure communication of the remote network node cannot be modified except with permission of the network operator. Especially, it is possible according to the present invention that the one-time password is already distributed to the at least one specific remote node of the plurality of remote nodes (prior to a failure of the first operational mode) such that it is advantageously possible to activate the second operational mode on the initiative of the at least one specific remote node of the plurality of remote nodes, but under the control of the network management node.

According to the present invention, the first message is, e.g., a DHCP discover message (i.e. requesting an IP address to be used by the at least one specific remote node of the plurality of remote nodes), and the second message is, e.g., a DHCP offer message (i.e. granting an IP address to be used). According to the present invention, it is preferred that, in the first operational mode, a DHCP offer message (analogous to the second message) comprises for example only the IP address to be used by the at least one specific remote node of the plurality of remote nodes, whereas, in the second operational mode, the second message comprises especially optional data, particularly the one-time password, as well as usually (according to the DHCP standard) an IP address.

Furthermore, it is preferred according to the present invention that the one-time password is initially stored in the remote nodes (or a plurality of one-time passwords are initially stored in the remote nodes). In order to achieve this, a distribution of the one-time password or the plurality of one-time passwords is realized from a node of the core network (e.g. a network management system node). Therefore, it is preferred according to the present invention that this distribution of the one-time password to the at least one specific remote node of the plurality of remote nodes is performed only during the specific remote node of the plurality of remote nodes being operated in the first operational mode and preferably via the secure communication tunnel.

Thereby, a further enhancement of the security level in the communication between the plurality of remote nodes, on the one hand, and the security gateway or other nodes of the telecommunications network, on the other hand, is possible as the one-time password is protected by the establishment of the secure communication channel between the plurality of remote nodes and the security gateway or further network nodes according to the first operational mode of the plurality of remote network nodes.

Still furthermore, it is preferred according to the present invention that in case the following conditions are cumulatively verified, the first message is sent from the at least one specific remote node of the plurality of remote nodes:

the secure communication tunnel cannot be established, and the physical interface for communication with the at least one security gateway is operational, and the default gateway is reachable by the at least one specific remote node of the plurality of remote nodes.

For example, the reachability (by the at least one specific remote node) of the default gateway is detected using bidirectional forwarding detection (BFD).

Thereby, it is advantageously possible according to the present invention, that not only in case of a breakdown of the security gateway or cluster of security gateways (where the security gateway or plurality of security gateways lose their functionality) but also in case of the inability of the network components to establish a secure communication tunnel, a switch-over in the second operational mode of the remote network nodes is possible.

According to yet another embodiment of the present invention, it is preferred that the first message is sent from the at least one specific remote node of the plurality of remote nodes only after a predetermined first time interval after establishing that the following conditions are cumulatively verified:

the secure communication tunnel cannot be established, and the physical interface for communication with the at least one security gateway is operational, and the default gateway is reachable by the at least one specific remote node of the plurality of remote nodes.

For example, the reachability (by the at least one specific remote node) of the default gateway is detected using bidirectional forwarding detection (BFD).

Thereby, it is advantageously possible to reduce the communication load of a network node provided to handle the first messages, such as a DHCP (Dynamic Host Configuration Protocol) server.

Furthermore, it is preferred according to the present invention that after initially sending the first message from the at least one specific remote node of the plurality of remote nodes without reception of the second message, the first message is repeated from the at least one specific remote node of the plurality of remote nodes.

According to this further embodiment of the present invention, it is advantageously possible to provide a self-healing functionality in case of interrupted communication between nodes of the telecommunications network.

According to a further embodiment of the present invention, it is preferred that repeating the first message occurs only after a predetermined second time interval after initially or previously sending the first message.

Thereby, it is advantageously possible to reduce the communication load of a network node provided to handle the first messages, such as a DHCP (Dynamic Host Configuration Protocol) server.

Furthermore, it is preferred according to the present invention that:

the at least one security gateway is an IPsec-gateway (Internet Protocol Security gateway) and the secure communication tunnel is an IPsec tunnel, and/or that' the plurality of remote nodes are at least partly nodes having a base station functionality in a Public Land Mobile Network (PLMN) network, especially an eNodeB functionality.

The present invention also relates to a telecommunications network comprising a plurality of remote nodes, one or a plurality of further network nodes, and at least one security gateway, wherein the telecommunications network is arranged to enhance high availability of secure communication functionality between the at least one security gateway and the one or the plurality of further network nodes, wherein each of the plurality of remote nodes is provided to communicate to the one or the plurality of further network nodes, wherein in a first operational mode of the plurality of remote nodes, during normal operation of the at least one security gateway, the telecommunications network is arranged such that each of the plurality of remote nodes communicates with the at least one security gateway via a secure communication tunnel, wherein in a second operational mode of the plurality of remote nodes, during failure of the secure communication tunnel, the telecommunications network is arranged such that at least one specific remote node of the plurality of remote nodes is connected to the one or the plurality of further network nodes by bypassing the security gateway, wherein the telecommunications network is arranged such that the first operational mode is switched to the second operational mode by an exchange of at least a first message and a second message between the at least one specific remote node of the plurality of remote nodes and the one or the plurality of further network nodes using the DHCP (Dynamic Host Configuration Protocol) protocol.

Thereby it is advantageously possible according to the present invention to avoid, at least partly, the enormous consequences of a severe failure security gateway nodes or security gateway clusters.

According to the present invention, it is preferred—also with respect to the telecommunications network—that the first message comprises a request from the at least one specific remote node of the plurality of remote nodes, and the second message comprises an answer to the first message by a network management node, the second message comprising a one-time password.

Thereby it is advantageously possible, that the operational mode related to the secure communication of the remote network node cannot be modified except with permission of the network operator. Especially, it is possible according to the present invention that the one-time password is already distributed to the at least one specific remote node of the plurality of remote nodes (prior to a failure of the first operational mode) such that it is advantageously possible to activate the second operational mode on the initiative of the at least one specific remote node of the plurality of remote nodes, but under the control of the network management node.

Furthermore, the present invention relates to a program comprising a computer readable program code which, when executed on a computer, causes the computer to perform an inventive method according to the present invention.

The present invention also relates to computer program product to enhance high availability in a telecommunications network, the computer program product comprising a computer program stored on a storage medium, the computer program comprising program code which, when executed on a computer, causes the computer to perform an inventive method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

In the following, it is referred to the Internet Protocol Security (IPsec) protocol and/or to the Internet Protocol Security tunnel (IPsec tunnel) as a prominent example of a secure communication protocol or method (and secure communication tunnel) between different (and normally distant) nodes of the telecommunications network. According to the present invention, in case that no IPsec tunnel can be established, a remote node (especially a radio node such as a base station or eNodeB) shall analyze its current network conditions to identify itself the cause of the failure. The switch to the second operational mode of the remote network node (i.e. the IPsec emergency bypass feature according to the present invention) is not be limited to the case of an unreachable IPsec gateway, but it is also invoked to cover the case where tunnel setup is rejected (e.g. IPsec gateway doesn't accept due to an error in the software with still valid certificates).

According to the present invention, the second operational mode is invoked based on the following conditions detected at the remote node:

IPsec tunnel cannot be established (either IPSecGW not reachable or tunnel setup rejected by the IPsecGW), physical interface is up default GW is reachable.

In such a situation, the remote node (e.g. a base station) shall assume a severe IPsec cluster failure.

As soon as a severe IPsec cluster failure is recognized, the remote node (especially a base station) has to verify that the operator approves the switch over to the second operational mode of the remote node (i.e. the "IPsec emergency bypass"). This is done by requesting a one time password from the operator's network, i.e. from a further network node, e.g. a network management system node (or a node providing the functionality of the network management system).

To request the one time password, the remote network node (especially a radio node) sends the first message, especially a DHCP request, via the config VLAN (configuration virtual local area network) used during SON PnP process (Self Organizing Networks Plug and Play process). The existing planned/operational VLAN with its IP configuration is maintained according to the present invention. The temporary IP address delivered by DHCP can immediately be released, as only the information in option code 43 is needed (in case that the first message is a DHCP message).

In case the DHCP response contains, in option code 43, a predetermined suboption with only one alpha-numerical string—e.g. the suboption 80 with only an alpha-numerical string—the remote node (e.g. the radio node) compares that string with an operator configurable parameter field "IPsec emergency bypass password". If the value in the predetermines suboption of the second message (e.g. the suboption 80) is equal to the value in this parameter field (in the remote node), the remote node (e.g. the radio node) switches of the IPSec functionality, i.e. it switches of the first operational mode and switches on the second operational mode.

In IPsec emergency bypass mode (i.e. in the second operational mode according to the present invention), the remote node (especially a radio node) uses the same VLAN ID, interface IP address, service IP addresses (loopback addresses), default GW (gateway) and firewall settings/ACL (Access Control List) rules (firewall/ACL in front of the IPsec tunnel to filter traffic going in and coming out of the IPsec tunnel according to the remote node (e.g. radio node) communication matrix) as in the IPsec mode (first operational mode according to the present invention). That means the remote node (especially the radio node) does not need any additional configuration data and can switch off the IPsec functionality autonomously but only in a manner controlled (or allowed by the verification of the one-time password) by the operator.

Once the IPsec cluster failure is resolved and the all remote nodes (e.g. radio nodes) have been switched back to IPSec (i.e. to the first operational mode), it is possible according to the present invention to set a new one time password in all attached remote nodes (e.g. radio nodes) by a single command.

Especially to avoid overload situations at the node handling the multitude of first messages (sent by the plurality of remote nodes), especially a DHCP server, and to control the switch over process it is preferred according to the present invention to use operator configurable (i.e. predetermined) timer (or time intervals), namely a timer "IPsec emergency bypass delay" as a predetermined first time interval and a timer "IPsec emergency bypass retry" as a predetermined second time interval.

By implementing the IPSec emergency bypass method according to the present invention, all traffic of a remote node (e.g. a radio node) can be protected with IPsec and the operator still has full network control even in case of IPSec failure. This greatly reduces the risk for network outages even with increased network security.

Figure 1:
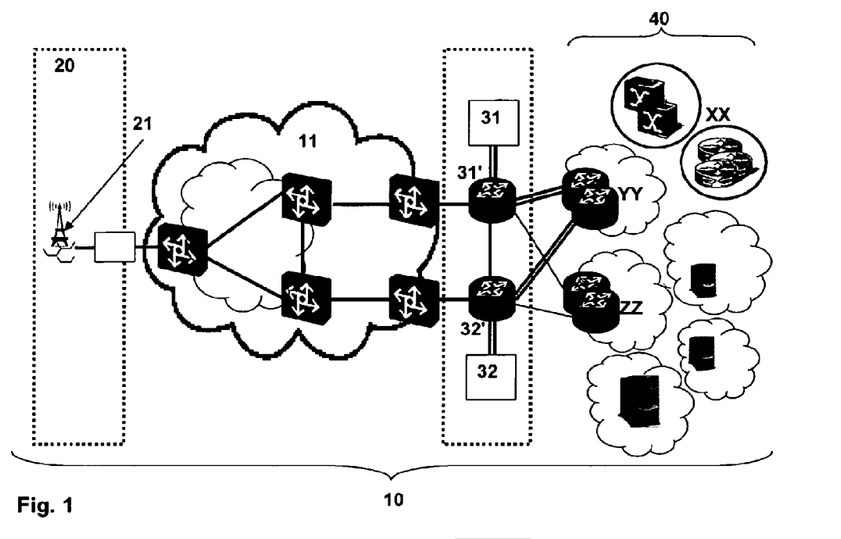
FIG. 1 schematically illustrates a telecommunications network according to an embodiment of the present invention.

In FIG. 1, a telecommunications network 10 according to the present invention is schematically shown. The telecommunications network 10 comprises a plurality of nodes, called remote nodes 20. One specific node or remote node of this plurality of network nodes 20 or remote nodes 20 is designated by reference sign 21. The network nodes or remote nodes 20 are especially so-called radio nodes having base station functionality, e.g. NodeB nodes or eNodeB nodes in an UTRAN and/or E-UTRAN public land mobile network.

The telecommunications network 10 furthermore also comprises further network nodes 40, typically part of the core network of the telecommunications network 10, such as network administration databases and/or content providing nodes or gateways to other parts of the telecommunications network 10 or to telecommunications networks of other providers or operators. Exemplarily, control plane and/or user plane components XX (e.g. a Mobility Management Entity (MME), a SGW (Serving Gateway) entity, a Media Gateway (MGW) or an MSS (Mobile Switching Center (MSC) Server), a Serving GPRS Support Node (SGSN), a GGSN Gateway GPRS support node), and different edge nodes YY, ZZ of a backbone network (e.g. IPMB component or network entity (IP mobile backbone component)) are schematically shown in FIG. 1.

The remote nodes 20 are connected to the further network nodes 40 via an aggregation network 11 which is also part of the telecommunications network 10. Furthermore, the telecommunications network 10 comprises at least one security gateway 31. The communication between the remote nodes 20 and the further network nodes 40 is normally realized as a secure communication where the security gateway 31 serves for handling passwords, session keys and administers the use of the public key infrastructure. The remote nodes 20 communicate with the security gateway 31 typically via a router device 31' assigned to the security gateway 31.

For realizing high availability of the secure communication between the remote nodes 20 and the further nodes 40, a further secure gateway 32 (as well as a further router device 32') is typically added to allow for redundancy in assuring the secure communication. Together, the security gateway 31 and the further security gateway 32 (and the respective routers 31', 32') are also referred to as the security cluster. The remote nodes 20 communicate with the security gateway 31 and/or with the further security gateway 32 in a secure way, especially using a variant of the IPsec protocol. This is also referred to by the term "first operational mode" according to the present invention.

In case that the security gateway relied on by a remote node 20 (or in case that the whole security cluster) fails, the remote nodes 20 cannot simply switch to a communication without using the IPsec protocol. In order to enhance the security level of the communication between the remote nodes 20 and the further network nodes 40, the transition to a communication without using the secure communication protocol (especially the IPsec protocol), which is referred to by the term "second operational mode" according to the present invention, is controlled by the core network of the telecommunications network 10, especially a network management functionality.

Figure 2:
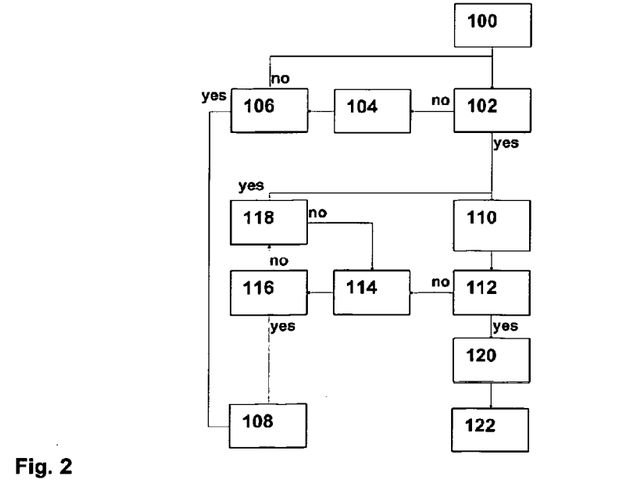
FIG. 2 schematically illustrates a diagram according to an embodiment of the present invention.

The transition to the second operational mode of a specific remote node 21 is schematically illustrated by FIG. 2. In a first step 100, a failure of the security cluster or at least the relevant security gateway 31 is detected by the remote node 20. This triggers starting a first timer defining a predetermined first time interval T1, referring to a secure communication emergency bypass delay (or an IPsec emergency bypass delay). In a second step 102, it is decided whether the first time interval T1 has expired. If no, the flow branches to a third step 104, if yes, the flow branches to a sixth step 110. In the third step 104, the re-establishment of the secure communication with the security gateway 31 or the security cluster is tried. In a fourth step 106, it is checked whether the secure communication tunnel with the security gateway was successfully (re-)established or not. If not, the flow branches to the second step 102; if yes, the flow branches to a fifth step 108 which signifies that the remote mode could successfully establish the secure communication channel or tunnel with the security gateway. In the sixth step 110, a first message is sent from the remote node 20 to one of the further network nodes 40, typically to a DHCP (Dynamic Host Configuration Protocol) server or node, requesting a password, especially a one-time password, allowing the transition to the second operational mode of the specific remote node 21. In response to the first message, the further network node 40 addressed by the first message (or another further network node 40) sends a second message to the specific remote node 21, especially comprising an DHCP option code 43 and a suboption 80 with an alpha-numerical string (as the one-time password). In a seventh step 112, it is checked whether the one-time password received by the specific remote node 21 is correct. If yes, the flow branches to an eleventh step 120. If not, the flow branches to an eighth step 114; furthermore, this triggers starting a second timer defining a predetermined second time interval T2, referring to a secure communication emergency bypass retry delay (or an IPsec emergency bypass retry delay). In the eighth step 114, a re-establishment of the secure tunnel is again tried (analogously to the third step 104). In a ninth step 116, it is checked whether the secure communication tunnel with the security gateway was successfully (re-)established or not. If not, the flow branches to a tenth step 118; if yes, the flow branches to the fifth step 108 which signifies that the remote mode could successfully establish the secure communication channel or tunnel with the security gateway. In the tenth step 118, it is checked whether the second time interval T2 has expired. If not, the flow branches to the eighth step 114; if yes, the flow branches to the sixth step 110.

In the eleventh step 120, the specific remote node 21 switches to the secure communication bypass mode, i.e. the second operational mode according to the present invention. This enables in a twelfth step 122 to recover the specific remote node 21 such that a communication with the core network (i.e. with one or a plurality of the further nodes 40) is possible without a manual interaction at the site of the remote node 21.

Figure 3:
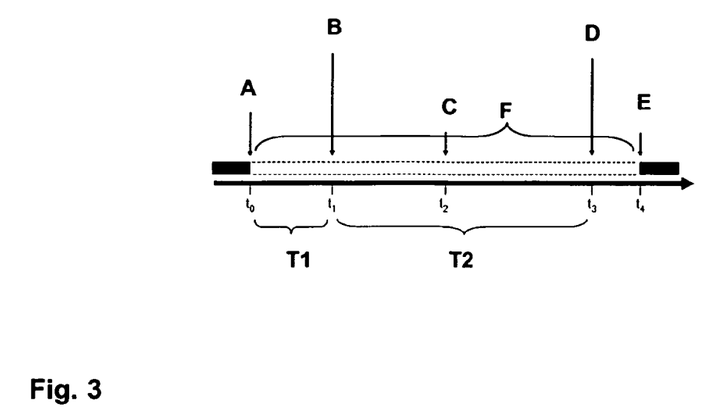
FIG. 3 schematically illustrates a timeline representing a method in an embodiment of the present invention.

In FIG. 3, the inventive method is again schematically illustrated using a time line. At point A, the secure communication (in the first operational mode of the specific remote node 21) is interrupted. During the time designated by reference sign F, the specific remote node 21 is out of service from the perspective of the core network. The interruption of the secure communication tunnel starts a timer related to the first predetermined time interval T1. At point B, the first message (comprising the request to the DHCP server) is emitted from the specific remote node 21. Furthermore at point B, a first answer is received (by the specific remote node 21) from the DHCP server. This first answer does typically not comprise the one-time password. This starts the predetermined second time interval T2. At point C, the DHCP server is reconfigured by the network operator. As a result, further answers (from the DHCP server, triggered by the first message from the specific remote node 21) do comprise the one-time password. At point D, the predetermined second time interval T2 ends and a second try of the first message can be sent by the specific remote node 21 to the DHCP server. On reception, at point E, of the second message comprising the (one-time) password (i.e. after operator triggered reconfiguration of the DHCP server), the specific remote node is switched to the second operational mode and is again visible and operational from the perspective of the core network, i.e. a self-healing has been applied to the communication link between the further network nodes 40 and the specific remote node 21. Such self-healing is, of course, to be applied to all of the plurality of remote nodes 20, the first and second time interval being preferably different in order to reduce the peak load to the DHCP server.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a", "an" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for enhancing high availability in a secure telecommunications network, the telecommunications network comprising a plurality of remote nodes, one or a plurality of further network nodes in communication with the plurality of remote nodes, and at least one security gateway, the method comprising:
  operating, during normal operation of the at least one security gateway, each of the plurality of remote nodes in a first operational mode, wherein in the first operational mode, each of the plurality of remote nodes communicates with the one or the plurality of further network nodes through the at least one security gateway via a secure communication tunnel;
  switching, in response to failure of the secure communications tunnel, from the first operational mode to a second operational mode for at least one specific remote node of the plurality of remote nodes based on an exchange of at least a first message and a second message between at least one specific remote node and the one or the plurality of further network nodes using Dynamic Host Configuration Protocol (DHCP), wherein the first message comprises a request from the at least one specific remote node and the second message comprises an answer to the first message by a network management node, the second message comprising a one-time password, and wherein the first message is sent in response to verifying the following conditions:
    the secure communication tunnel cannot be established,
    the physical interface for communication with the at least one security gateway is operational, and
    a default gateway is reachable by the at least one specific remote node and is operational; and
  operating, during failure of the secure communication tunnel, the at least one specific remote node in the second operational mode by connecting the at least one specific remote node to the one or the plurality of further network nodes by bypassing the at least one security gateway;
  wherein the at least one specific remote node and the one or the plurality of further network nodes are controlled by the telecommunications network's operator;
  wherein the first message is sent from the at least one specific remote node after a predetermined first time interval (T1) elapses after the conditions are verified.

2. The method according to claim 1, wherein a distribution of the one-time password to the at least one specific remote node is performed only during the at least one specific remote node being operated in the first operational mode and via the secure communication tunnel.

3. The method according to claim 1, wherein after initially sending the first message from the at least one specific remote node without reception of the second message, the first message is repeated from the at least one specific remote node.

4. The method according to claim 3, wherein repeating the first message occurs only after a predetermined second time interval (T2) after initially or previously sending the first message.

5. The method according to claim 1, wherein the at least one security gateway is an Internet Protocol Security gateway (IPsec-gateway) and wherein the secure communication tunnel is an IPsec tunnel.

6. The method according to claim 1, wherein the plurality of remote nodes are at least partly nodes having a base station functionality in a Public Land Mobile Network (PLMN) network, wherein the base station functionality comprises an eNodeB functionality.

7. A telecommunications network for enhancing high available of secure communication functionality, comprising:
  a plurality of remote nodes;
  one or a plurality of further network nodes, configured to communicate with the plurality of remote nodes; and
  at least one security gateway;
  wherein the plurality of remote nodes are configured to, in a first operational mode, during normal operation of the at least one security gateway, communicate with the one or the plurality of further network nodes through the at least one security gateway via a secure communication tunnel;
  wherein at least one specific remote node of the plurality of remote nodes is configured to, in response to failure of the secure communications tunnel, switch from the first operational mode to a second operational mode based on an exchange of at least a first message and a second message with the one or the plurality of further network nodes using Dynamic Host Configuration Protocol (DHCP), wherein the first message comprises a request from the at least one specific remote node, and the second message comprises an answer to the first message by a network management node, the second message comprising a one-time password, and wherein the at least one specific remote node is configured to send the first message in response to and after a predetermined first time interval (T1) elapses after the following conditions being verified:
    the secure communication tunnel cannot be established,
    the physical interface for communication with the at least one security gateway is operational, and
    a default gateway is reachable by the at least one specific remote node and is operational;
  wherein the at least one specific remote node is configured to, in the second operational mode, during failure of the secure communication tunnel, be connected to the one or the plurality of further network nodes by bypassing the at least one security gateway;
  wherein the at least one specific remote node and the one or the plurality of further network nodes are controlled by the telecommunications network's operator.

8. A non-transitory computer-readable medium comprising processor-readable program code for enhancing high availability in a secure telecommunications network, the telecommunications network comprising a plurality of remote nodes, one or a plurality of further network nodes in communication with the plurality of remote nodes, the processor-readable program code, when executed by a processor, causing the following steps to be performed:
  operating, during normal operation of the at least one security gateway, each of the plurality of remote nodes in a first operational mode, wherein in the first operational mode, each of the plurality of remote nodes communicates with the one or the plurality of further network nodes through the at least one security gateway via a secure communication tunnel;
  switching, in response to failure of the secure communications tunnel, from the first operational mode to a second operational mode for at least one specific remote node of the plurality of remote nodes based on an exchange of at least a first message and a second message between at least one specific remote node and the one or the plurality of further network nodes using Dynamic Host Configuration Protocol (DHCP), wherein the first message comprises a request from the at least one specific remote node and the second message comprises an answer to the first message by a network management node, the second message comprising a one-time password, and wherein the first message is sent in response to verifying the following conditions:

the secure communication tunnel cannot be established, the physical interface for communication with the at least one security gateway is operational, and a default gateway is reachable by the at least one specific remote node and is operational; and operating, during failure of the secure communication tunnel, the at least one specific remote node in the second operational mode by connecting the at least one specific remote node to the one or the plurality of further network nodes by bypassing the at least one security gateway;

wherein the at least one specific remote node and the one or the plurality of further network nodes are controlled by the telecommunications network's operator;

wherein the first message is sent from the at least one specific remote node after a predetermined first time interval (T1) elapses after the conditions are verified.

* * * * *